United States Patent
Imre

(10) Patent No.: US 10,276,853 B2
(45) Date of Patent: Apr. 30, 2019

(54) ELECTRODE ARRANGEMENT OF A BATTERY CELL, ELECTRODE LAYER AND BATTERY CELL AND METHOD FOR PRODUCING THE LATTER

(71) Applicant: Robert Bosch GmbH, Stuttgart (DE)

(72) Inventor: Arpad Imre, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 15/597,300

(22) Filed: May 17, 2017

(65) Prior Publication Data
US 2017/0338462 A1   Nov. 23, 2017

(30) Foreign Application Priority Data
May 19, 2016   (DE) .......................... 10 2016 208 589

(51) Int. Cl.
| H01M 2/00 | (2006.01) |
| H01M 2/26 | (2006.01) |
| H01M 2/02 | (2006.01) |
| H01M 4/66 | (2006.01) |
| H01M 10/04 | (2006.01) |

(52) U.S. Cl.
CPC ........... *H01M 2/263* (2013.01); *H01M 2/024* (2013.01); *H01M 2/027* (2013.01); *H01M 2/0287* (2013.01); *H01M 4/661* (2013.01); *H01M 4/663* (2013.01); *H01M 10/0422* (2013.01); *H01M 10/0431* (2013.01)

(58) Field of Classification Search
CPC ............... H01M 2/263; H01M 4/6614; H01M 10/0422; H01M 2/024; H01M 10/0431; H01M 4/663
See application file for complete search history.

(56) References Cited

U.S. PATENT DOCUMENTS

| 2011/0070477 A1* | 3/2011 | Fujiwara | ................. H01M 2/22 429/152 |
| 2011/0200857 A1 | 8/2011 | Kaga et al. | |
| 2014/0079983 A1* | 3/2014 | Murata | ................... H01M 2/06 429/161 |
| 2017/0062792 A1* | 3/2017 | Baik | ..................... H01M 2/263 |

FOREIGN PATENT DOCUMENTS

| CN | 204289628 | 4/2015 |
| EP | 2124285 | 11/2009 |
| JP | 2011249243 | 12/2011 |
| WO | 2013083213 | 6/2013 |

* cited by examiner

*Primary Examiner* — Cynthia H Kelly
*Assistant Examiner* — Monique M Wills
(74) *Attorney, Agent, or Firm* — Michael Best & Friedrich LLP

(57) ABSTRACT

An electrode arrangement of a battery cell (10) comprising a positive electrode layer (2) and a negative electrode layer (3), which are separated from one another in an electrically insulating manner by a separator layer (4), wherein the positive electrode layer (2) forms a plurality of first contacting sections (21) formed in each case for an electrical contacting of the positive electrode layer (2) by a first current conductor (81), and the negative electrode layer (3) forms a plurality of second contacting sections (31) formed in each case for an electrical contacting of the negative electrode layer (3) by a second current conductor (82).

21 Claims, 3 Drawing Sheets

ELECTRODE ARRANGEMENT OF A BATTERY CELL, ELECTRODE LAYER AND BATTERY CELL AND METHOD FOR PRODUCING THE LATTER

BACKGROUND OF THE INVENTION

The invention is based on an electrode arrangement of a battery cell. An electrode layer and a battery cell are also subject matter of the present invention. Furthermore, the invention also relates to a method for producing the battery cell.

It is known from the prior art that batteries used in particular as drive batteries in hybrid, plug-in hybrid and electric vehicles or else as stationary stores, such as lithium-ion batteries, for example, can be constructed modularly, that is to say consist of a plurality of battery modules.

Furthermore, a battery module additionally preferably has a multiplicity of individual battery cells that are interconnected among one another to form the battery module. In this case, the individual battery cells can be interconnected in series or in parallel with one another. Furthermore, the voltage taps of the individual battery cells, such as, in particular, lithium-ion battery cells, lithium-polymer battery cells, lithium-metal battery cells or lead-acid accumulators, are electrically conductively connected to one another by means of so-called cell connectors.

The geometry and the dimensioning of a battery cell here influence the mechanical, electrical and thermal properties of the battery cell and thus of the battery module and also of the entire battery. It is known from the prior art to form battery cells as a round, pouch, button or prismatic cell, which may be advantageous in each case for different applications. The cell-internal construction here essentially determines these advantages and also the possibilities for application of the battery cells, wherein for example in the case of round cells for electrically contacting electrochemical components of the battery cells, contacting sections also referred to as "tabs" are known from the prior art, which contacting sections electrically conductively connect an electrode to a housing of the battery cell or a voltage tap of the battery cell. By contrast, in the case of prismatic cells, rods formed primarily from aluminum or copper are known as voltage taps.

Battery cell sizes are currently standardized in order to be able to use battery cells from different cell manufacturers in different vehicles. As a consequence of increasing endeavors to achieve standardization at the module level, battery modules might supersede battery cells as basic building blocks of a battery.

The document US 2014/0292284 discloses a wound battery cell comprising a positive electrode layer and a negative electrode layer, which are formed in each case as a coated foil. The positive electrode layer and the negative electrode layer here are separated from one another by a separator layer. Furthermore, the positive electrode layer and the negative electrode layer are electrically contacted in each case by a contacting element.

SUMMARY OF THE INVENTION

The electrode arrangement of a battery cell according to the invention has the advantage that a reliable electrical contacting of the electrode arrangement is possible in a simple and cost-effective manner, wherein in particular thermal properties of the battery cell, such as the possibility for heat dissipation, can also be improved. Overall, a plurality of contacting sections make it possible to form a larger-area electrical contacting, which leads in particular to lower resistances, as a result of which the heat input can be reduced.

The invention provides an electrode arrangement of a battery cell. The electrode arrangement comprises a positive electrode layer and a negative electrode layer. In this case, the positive electrode layer and the negative electrode layer are separated from one another in an electrically insulating manner by a separator layer. Furthermore, the positive electrode layer forms a plurality of first contacting sections formed in each case for an electrical contacting of the positive electrode layer by a first current conductor. Furthermore, the negative electrode layer forms a plurality of second contacting sections formed in each case for an electrical contacting of the negative electrode layer by a second current conductor.

In particular, the positive electrode layer and the plurality of first contacting sections are formed integrally. Furthermore, in particular, the negative electrode layer and the plurality of second contacting sections are formed integrally. In this case, it is furthermore also possible for the plurality of first contacting sections to be connected, preferably cohesively connected, to the positive electrode layer. Furthermore, it is also possible for the plurality of second contacting sections to be connected, preferably cohesively connected, to the negative electrode layer.

It should be noted at this juncture that a first current conductor or respectively a second current conductor should be understood to mean a component designed to pass on the electrical energy converted into electric current by the electrode arrangement. In particular, the first current conductor or respectively the second current conductor is formed from an electrically conductive material.

It is advantageous if at least one first contacting section and/or at least one second contacting section are formed in such a way that the at least one first contacting section and/or the at least one second contacting section, for an electrical contacting by the first current conductor and/or the second current conductor, respectively, are/is arranged in an angled manner with respect to a plane formed by the electrode arrangement. As a result, a reliable and volume-saving electrical contacting of the electrode arrangement is possible, as a result of which the specific energy can be increased. The plane formed by the electrode arrangement, in particular the first electrode layer and/or the second electrode layer, should be understood as a plane defined by a longitudinal direction of the electrode arrangement and a transverse direction of the electrode arrangement, said transverse direction being arranged perpendicularly to the longitudinal direction. Furthermore, the angled arrangement of the first contacting section and/or of the second contacting section should be understood to mean that a contacting section also has in each case a longitudinal direction and a transverse direction arranged perpendicularly to the longitudinal direction, which jointly define a plane, wherein the plane of the electrode arrangement and the plane of the contacting section are arranged in an angled manner with respect to one another; in particular, the normal vectors are arranged at an angle to one another.

Furthermore, it is also advantageous if at least one first contacting section and at least one second contacting section are formed in such a way that the at least one first contacting section and the at least one second contacting section, for an electrical contacting by the first current conductor and the second current conductor respectively, are arranged substantially parallel to one another. As a result, it is possible also to arrange the first current conductor and the second current conductor parallel to one another in a simple manner, as a result of which furthermore, in particular, an efficient electrical interconnection of a plurality of electrode arrangements is possible in conjunction with a simultaneous increase in the specific energy.

Furthermore, it is additionally advantageous if at least one first contacting section and at least one second contacting section are formed in such a way that the at least one first contacting section and the at least one second contacting section, for an electrical contacting by the first current conductor and the second current conductor respectively, are arranged in directions facing away from one another. As a result, it is possible to arrange the first current conductor and the second current conductor in a manner separated from one another, in order thus to prevent electrical short circuits between the positive electrode layer and the negative electrode layer. In particular, the at least one first contacting section and the at least one second contacting section are also arranged on opposite sides of the electrode arrangement, such that a serial and also parallel interconnection of a plurality of electrode arrangements is possible in a simple manner.

It is expedient if the electrode arrangement has a longitudinal direction and the plurality of first contacting sections are arranged on a first outer side of the positive electrode layer and/or the plurality of second contacting sections are arranged on a second outer side of the negative electrode layer. Furthermore, the first outer side of the positive electrode layer and the second outer side of the negative electrode layer, in the longitudinal direction of the electrode arrangement, are arranged on mutually opposite outer sides of the electrode arrangement. As a result, it is possible in a simple manner for a plurality of electrode arrangements to be electrically conductively interconnected with one another by means of the first current conductor and the second current conductor. In particular, a plurality of electrode arrangements can be interconnected in series with one another, wherein preferably in each case a first current conductor which electrically conductively contacts a plurality of first contacting sections of the positive electrode layer of an electrode arrangement furthermore forms the second current conductor of an adjacent electrode arrangement and thus electrically conductively contacts a plurality of second contacting sections of the negative electrode layer of the adjacent electrode arrangement. It is thus possible to reduce the number of required elements of a battery module and furthermore also to increase the specific energy or power of a battery system by virtue of a reduction of the weight of electrochemically inactive cell components.

In accordance with a first concept of the invention, the electrode arrangement has a longitudinal direction. Furthermore, a first contacting section of the plurality of first contacting sections has in each case a first surface and a second contacting section of the plurality of second contacting sections has in each case a second surface. In this case, the electrode arrangement has at least one region in which, in the longitudinal direction of the electrode arrangement, the surface area of the first surfaces of the first contacting sections and/or the surface area of the second surfaces of the second contacting sections increase in each case. As a result, particularly in the case of electrode arrangements formed as cell windings, it is possible to enable a reliable electrical contacting. Preferably, here the surface of a contacting section situated closer to the winding center is smaller than the surface of a contacting section situated further away therefrom. In particular, a linear increase in the surface area is advantageous. As a result, a uniform distribution of the total area of the contacting sections over that side of the cell winding which is to be contacted is possible. It goes without saying, however, that the opposite case is also possible if the latter enables a more reliable electrical contacting, for example.

In accordance with a second concept of the invention, the electrode arrangement has a longitudinal direction. Furthermore, two adjacent first contacting sections of the plurality of first contacting sections are spaced apart from one another in each case by a first spacing. Furthermore, two adjacent second contacting sections of the plurality of second contacting sections are spaced apart from one another in each case by a second spacing. In this case, the electrode arrangement has at least one region in which, in the longitudinal direction of the electrode arrangement, the first spacings of two first contacting sections and/or the second spacings of two second contacting sections increase in each case. As a result, particularly in the case of electrode arrangements formed as cell windings, it is possible to enable a reliable electrical contacting. Preferably, here the spacings of two contacting sections increase, preferably linearly, with increasing distance from the winding center. As a result, a uniform distribution of the total area of the contacting sections over that side of the cell winding which is to be contacted is possible. It goes without saying, however, that the opposite case is also possible if the latter enables a reliable electrical contacting, for example.

It is also expedient if the positive electrode layer is arranged in a manner spaced apart from the plurality of second contacting sections. Furthermore, it is also expedient if the negative electrode layer is arranged in a manner spaced apart from the plurality of first contacting sections. Preferably, the first electrode layer and the second electrode layer are arranged at least partly in an offset manner with respect to one another in the transverse direction of the electrode arrangement. Furthermore, the positive electrode layer can be separated from the plurality of second contacting sections in an electrically insulating manner preferably by the separator layer. Furthermore, the negative electrode layer can be separated from the plurality of first contacting sections in an electrically insulating manner preferably by the separator layer. As a result, it is possible to prevent electrical contacts between the positive electrode layer and in particular also the first contacting sections thereof and the negative electrode layer and in particular also the second contacting sections thereof.

In addition, it is also possible for at least one first contacting section and/or at least one second contacting section partly to have an electrically insulating coating. As a result, it is possible preferably also to prevent electrical contactings between the first electrode layer and the second electrode layer.

It is particularly advantageous if at least one first contacting section and/or at least one second contacting section comprise(s) an elastic portion or are/is formed at least partially in an elastic fashion. As a result, a reliable electrical contacting can be made possible. In particular, it is thus possible to increase tolerances in the fitting of the first current conductor and/or the second current conductor, since a contacting section formed in an elastic fashion or a contacting section comprising an elastic portion can compensate in particular for manufacturing-dictated deviations.

In particular, as a result there is also no need for any further joining processes, such as, for example, in the production of a cohesive connection between a contacting section and a current conductor for example by means of a welding process. As a result, by reducing required joining points, it is possible to reduce the outlay in the electrically conductive contacting of the electrode arrangement by a current conductor during assembly in comparison with contactings by means of "tabs" known from the prior art. It goes without saying, however, that it is also possible for a contacting section together with a current conductor to be electrically conductively connected to one another cohesively, in particular by means of a welding process.

Preferably, the electrode arrangement is formed in a wound fashion. In this case, the positive electrode layer and the negative electrode layer are separated from one another in an electrically insulating manner by a separator layer. As a result, an electrode arrangement also referred to as cell winding can be provided which has a high specific energy, for example.

In this case, a cell winding should be understood to mean an electrode arrangement which preferably comprises only a positive electrode layer formed in a continuous fashion and only a negative electrode layer formed in a continuous fashion. Furthermore, the positive electrode layer and the negative electrode layer are separated from one another in an electrically insulating manner by a separator layer. Prior to winding, the positive electrode layer, the negative electrode layer and the separator layer are in each case preferably formed in a planar fashion. A cylindrical structure having a first planar base surface and a second planar base surface is formed as a result of the winding, in particular around a winding center. The resulting height of the cylindrical structure is preferably the spacing between the first outer side and the second outer side, which have already been described further above, in the transverse direction of the electrode arrangement. In this case, a structure composed of alternately arranged positive and negative electrode layers, between which a separator layer is respectively arranged, respectively arises in a cross section through the cell winding perpendicular to one of the planar base surfaces.

In this case, it is furthermore preferred if the electrode arrangement formed in a wound fashion has a substantially planar first base surface and a substantially planar second base surface, which are arranged opposite one another. Furthermore, the first current conductor is arranged areally on the first base surface and/or the second current conductor is arranged areally on the second base surface. To that end, it is preferred if the first contacting sections are arranged in a manner facing in the direction of the first base surface and the second contacting sections are arranged in a manner facing in the direction of the second base surface. Overall, a compact construction of an electrode arrangement contacted by current conductors can thus be provided which can be interconnected with further electrode arrangements in a simple manner. In particular, such an electrode arrangement has a high efficiency with low electrical losses. Moreover, the electrode layers can be reliably contacted with current conductors, such that an efficient thermal contacting is formed, which should be understood to mean that besides the reduction of the electrical resistance, which leads overall to lower heat inputs, the heat dissipation can also be increased as a result of the large-area contacting.

Furthermore, the invention also relates to an electrode layer. In this case, the electrode layer is a positive electrode layer or a negative electrode layer. Furthermore, the electrode layer forms a plurality of contacting sections formed in each case for an electrical contacting of the electrode layer by a current conductor. As a result, a reliable electrical contacting of the electrode layer can be made possible. In particular, the electrode layer is also formed as an electrode layer of an electrode arrangement which has already been described, and can thus also be developed in accordance with the developments described and thus also has the corresponding advantages.

It is advantageous if at least one contacting section is formed in such a way that the at least one contacting section, for an electrical contacting by the current conductor is arranged in an angled manner with respect to the electrode layer. Here, too, the angled formation should be understood to mean that, as already described above, the electrode layer has a longitudinal direction and a transverse direction arranged perpendicularly to the longitudinal direction, which describe a plane of the electrode layer. Furthermore, the contacting section also has a longitudinal direction and a transverse direction arranged perpendicularly to the longitudinal direction, which describe a plane of the contacting section. In this case, the plane of the electrode layer and the plane of the contacting section are arranged in an angled manner with respect to one another, that is to say that preferably their normal vectors are arranged at an angle, for example at an angle of between 0 degrees and 90 degrees, with respect to one another. As a result, preferably the specific power can be increased.

In accordance with one concept of the invention, the electrode layer has a longitudinal direction, and the plurality of contacting sections are arranged on an outer side of the electrode layer. Furthermore, a contacting section of the plurality of contacting sections has in each case a surface. In this case, the electrode layer has at least one region in which, in the longitudinal direction of the electrode layer, the surface area of the surfaces of the contacting sections increase in each case. As a result, it is possible, in the case of the arrangement of the electrode layer in the case of an electrode arrangement formed as a cell winding, to form a more uniform distribution of the total area of the contacting sections.

In accordance with a further concept of the invention, the electrode layer has a longitudinal direction, and the plurality of contacting sections are arranged on an outer side of the electrode layer. Furthermore, the contacting sections are spaced apart from one another in each case along the longitudinal direction. In this case, two adjacent contacting sections of the plurality of contacting sections are spaced apart from one another in each case by a spacing. In this case, the electrode layer has at least one region in which, in the longitudinal direction of the electrode layer, the spacings of two contacting sections increase in each case. As a result, it is possible, in the case of the arrangement of the electrode layer in the case of an electrode arrangement formed as a cell winding, to form a uniform distribution of the total area of the contacting sections.

Furthermore, the invention also relates to a battery cell. In this case, the battery cell comprises an electrode arrangement already described and/or an electrode layer already described. Furthermore, the plurality of first contacting sections are electrically contacted by a first current conductor. Furthermore, the plurality of second contacting sections are also electrically contacted by a second current conductor. Consequently, a reliable electrical contacting of an electrode arrangement can be provided in a simple manner.

It is particularly advantageous if the battery cell comprises a housing having at least one housing wall. In particular, the housing comprises a first housing wall and a second housing wall. In this case, the at least one housing wall is formed as first current conductor or as second current conductor. Preferably, in particular the first housing wall is formed as first current conductor and the second housing wall is formed as second current conductor. As a result, it is possible to reduce the number of required components for the contacting of an electrode arrangement.

Furthermore, it is advantageous if the first current conductor and/or the second current conductor have/has an electrically conductive coating. In particular, the electrically conductive coating can also be formed from a chemically passivated material. Preferably, the coating here is formed from gold, nickel or carbon.

Preferably, a contacting section of an electrode layer according to the invention, in particular a first contacting section and/or a second contacting section of an electrode arrangement according to the invention, can also have an electrically conductive coating. In particular, the electrically conductive coating can also be formed from a chemically passivated material. Preferably, the coating here is formed from gold, nickel or carbon. As a result, corrosion can be prevented or reduced.

Furthermore, the invention also relates to a method for producing a battery cell. A battery cell should be understood at this juncture to mean an electrode arrangement whose positive electrode layer is electrically contacted by a first current conductor and whose negative electrode layer is electrically contacted by a second current conductor. In this case, in a first step an electrode arrangement described above is provided. Furthermore, in the first step a positive electrode layer and a negative electrode layer, which have already been described above, and a separator layer can also be provided. Furthermore, the positive electrode layer and negative electrode layer are arranged in a manner separated from one another in an electrically insulating manner by the separator layer. In a second step, furthermore, a first current conductor and a second current conductor are provided. Then, in a third step, the plurality of first contacting sections are electrically contacted by the first current conductor and the plurality of second contacting sections are electrically contacted by the second current conductor.

At this juncture it should expressly be pointed out again that the battery cell according to the invention and the method according to the invention for producing a battery cell can preferably be developed by the developments and alternative embodiments described in association with the electrode arrangement and/or the electrode layer and accordingly also have the corresponding advantages demonstrated.

BRIEF DESCRIPTION OF THE DRAWINGS

Exemplary embodiments of the invention are illustrated in the drawings and are explained in greater detail in the following description.

In the figures.

DETAILED DESCRIPTION

Figure 1:
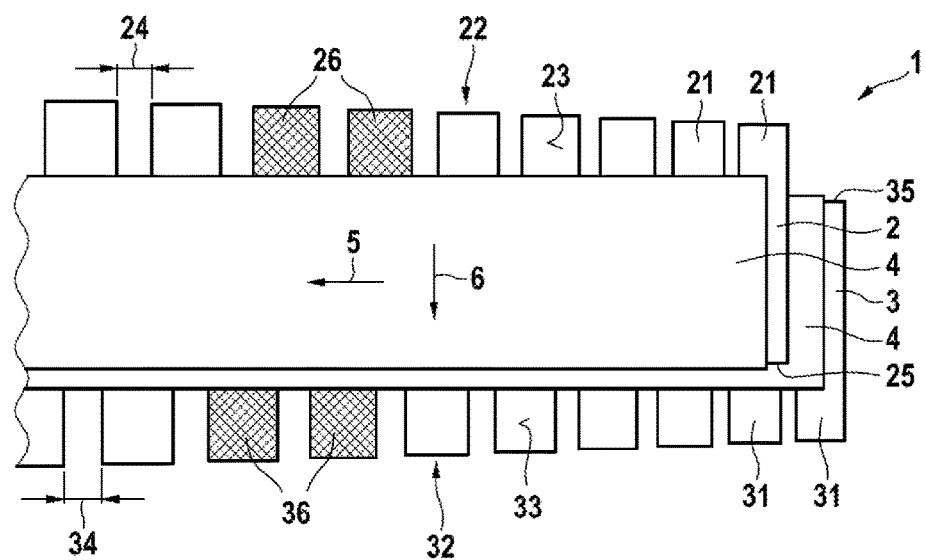
FIG. 1 schematically shows one embodiment of an electrode arrangement according to the invention of a battery cell, FIG. 2 schematically shows one embodiment of an electrode arrangement according to the invention of a battery cell with angled contacting sections, FIG. 3 schematically shows one embodiment of a battery cell according to the invention with an electrode arrangement formed as a cell winding, and FIG. 4 schematically shows one embodiment according to the invention of an electrode arrangement formed as a cell winding in a side view.

FIG. 1 schematically shows one embodiment of an electrode arrangement 1 according to the invention of a battery cell 10.

The electrode arrangement 1 comprises a positive electrode layer 2 and a negative electrode layer 3. Furthermore, the positive electrode layer 2 and the negative electrode layer 3 are separated from one another in an electrically insulating manner by a separator layer 4.

The positive electrode layer 2 and respectively the negative electrode layer 3 and respectively the separator layer 4 have in each case a longitudinal direction 5 and a transverse direction 6. The longitudinal direction 5 and the transverse direction 6 here are arranged perpendicularly to one another. A layer should be understood here to mean that the extent of the positive electrode layer 2 and respectively of the negative electrode layer 3 and respectively of the separator layer 4 perpendicular to the longitudinal direction 5 and perpendicular to the transverse direction 6 is significantly smaller than the extent in the longitudinal direction 5 and in the transverse direction 6.

Furthermore, the positive electrode layer 2 has a plurality of first contacting sections 21. The negative electrode layer 3 furthermore has a plurality of second contacting sections 31. Here the plurality of first contacting sections 21 are formed in each case for an electrical contacting of the positive electrode layer 2 by a first current conductor 81, yet to be described. Furthermore, here the plurality of second contacting sections 31 are formed in each case for an electrical contacting of the negative electrode layer 3 by a second current conductor 82, yet to be described.

Furthermore, the plurality of first contacting sections 21 are arranged on a first outer side 22 of the positive electrode layer 2. Furthermore, the plurality of second contacting sections 31 are also arranged on a second outer side 32 of the negative electrode layer 3. In this case, FIG. 1 shows that the first outer side 22 of the positive electrode layer 2 and the second outer side 32 of the negative electrode layer 3 in the longitudinal direction 5 of the electrode arrangement 1 are arranged on mutually opposite outer sides 21, 22 of the electrode arrangement 1.

A first contacting section 21 of the plurality of first contacting sections 21 has in each case a first surface 23 and a second contacting section 31 of the plurality of second contacting sections 31 has in each case a second surface 33. As can be discerned from FIG. 1, the electrode arrangement 1 has in the longitudinal direction 5 here a first region, in which, in the longitudinal direction 5, the surface areas of the first surfaces 23 of the first contacting sections 21 increase. Furthermore, the electrode arrangement 1, as can be discerned from FIG. 1, has in the longitudinal direction 5 a second region, in which the surface areas of the second surfaces 33 of the second contacting sections 31 increase.

Two first contacting sections 21 of the plurality of first contacting sections 21 are spaced apart from one another in each case by a first spacing 24. Two second contacting sections 31 of the plurality of second contacting sections 31 are spaced apart from one another in each case by a second spacing 34. As can be discerned from FIG. 1, the electrode arrangement 1 has in the longitudinal direction 5 a third region, in which, in the longitudinal direction 5, the first spacings 24 of two first contacting sections 21 increase. Furthermore, the electrode arrangement 1, as can be discerned from FIG. 1, has in the longitudinal direction 5 a fourth region, in which the second spacings 34 of two second contacting sections 31 increase.

It can furthermore be discerned from FIG. 1 that the positive electrode layer 2 is arranged in a manner spaced apart from the plurality of second contacting sections 31. Furthermore, the separator layer 4 is also arranged for an electrical insulation between the positive electrode layer 2 and the first contacting sections 31. It can also be discerned from FIG. 1 that the negative electrode layer 3 is arranged in a manner spaced apart from the plurality of first contacting sections 21. Furthermore, the separator layer 4 is also arranged for an electrical insulation between the negative electrode layer 3 and the first contacting sections 21. Particularly if the first contacting sections 21 and/or the second contacting sections 31 for an electrical contacting are arranged in an angled manner, which will be described with reference to the following figures, it is thus possible to prevent an electrical contacting between the positive electrode layer 2 and the negative electrode layer 3. Preferably, for this purpose the positive electrode layer 2 and the negative electrode layer 3 are arranged in a manner offset with respect to one another in the transverse direction 6. This should be understood to mean that the outer side 25—opposite the outer side 22—of the positive electrode layer 2 and the outer side 35—opposite the outer side 32—of the negative electrode layer 3 in each case do not extend as far as the second contacting sections 31 and first contacting sections 21, respectively.

Furthermore, it is also preferred if a contacting section 21, 31 partly has an electrically insulating coating 26, 36.

Figure 2:
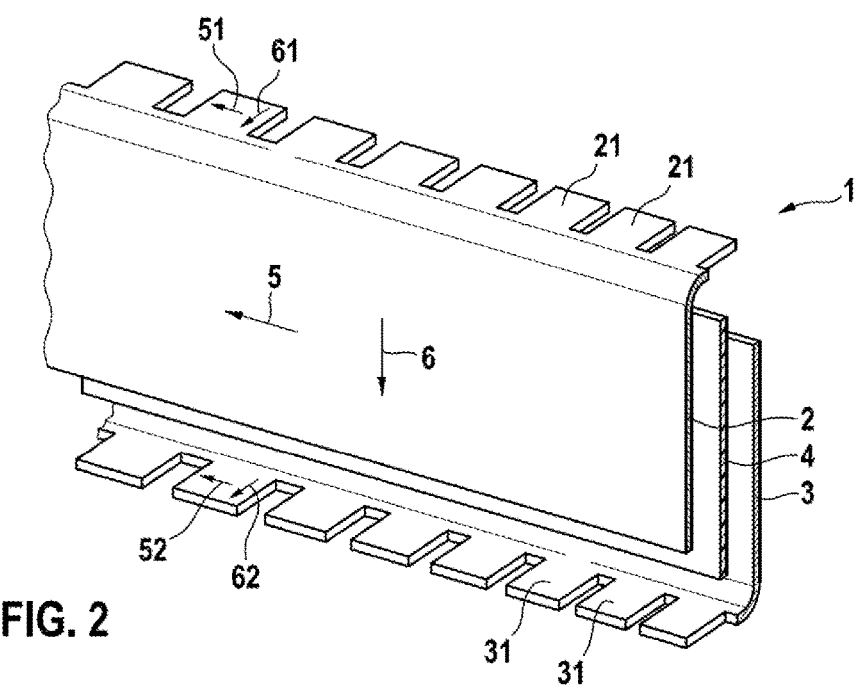

FIG. 2 schematically shows an electrode arrangement 1 in which first contacting sections 21 and second contacting sections 31, for an electrical contacting by the first current conductor 81 and the second current conductor 82, respectively, are arranged in an angled manner with respect to a plane formed by the electrode arrangement 1.

In this case, the plane of the electrode arrangement 1 is described by the longitudinal direction 5 thereof and the transverse direction 6 arranged perpendicularly thereto. Furthermore, the first contacting sections 21 also have in each case a longitudinal direction 51 and a transverse direction 61 arranged perpendicularly thereto, which describe the plane of a first contacting section 21. Furthermore, the second contacting sections 31 also have a longitudinal direction 52 and a transverse direction 62 arranged perpendicularly thereto, which describe the plane of a second contacting section 31.

It can then be discerned from FIG. 2 that the normal vector of the plane of the electrode arrangement 1, in particular of the plane of the first electrode layer 2 and/or in particular of the plane of the second electrode layer 3, and the normal vector of the plane of a first contacting section 21 and/or the normal vector of the plane of the second contacting section 31, are arranged at an angle to one another.

Furthermore, FIGS. 1 and 2 also show that a first contacting section 21 and a second contacting section 31 are arranged substantially parallel to one another, wherein an arrangement in accordance with FIG. 2 is preferred. In this case, in particular, the normal vectors of the plane of the first contacting sections 21 and the normal vectors of the plane of the second contacting sections 31 are arranged parallel to one another.

Furthermore, FIG. 2 also shows that a first contacting section 21 and a second contacting section 31 are arranged in directions facing away from one another. In this case, the plurality of first contacting sections 21 face in the direction of the rear side—not discernible—of the electrode arrangement 1 and the plurality of second contacting sections 31 face in the direction of the front side of the electrode arrangement 1, which is at the front in the viewing direction and is discernible.

The first contacting sections 21 and/or second contacting sections 31 shown in FIG. 2 are formed in an elastic fashion and are thereby at least partly reversibly deformable.

Figure 3:
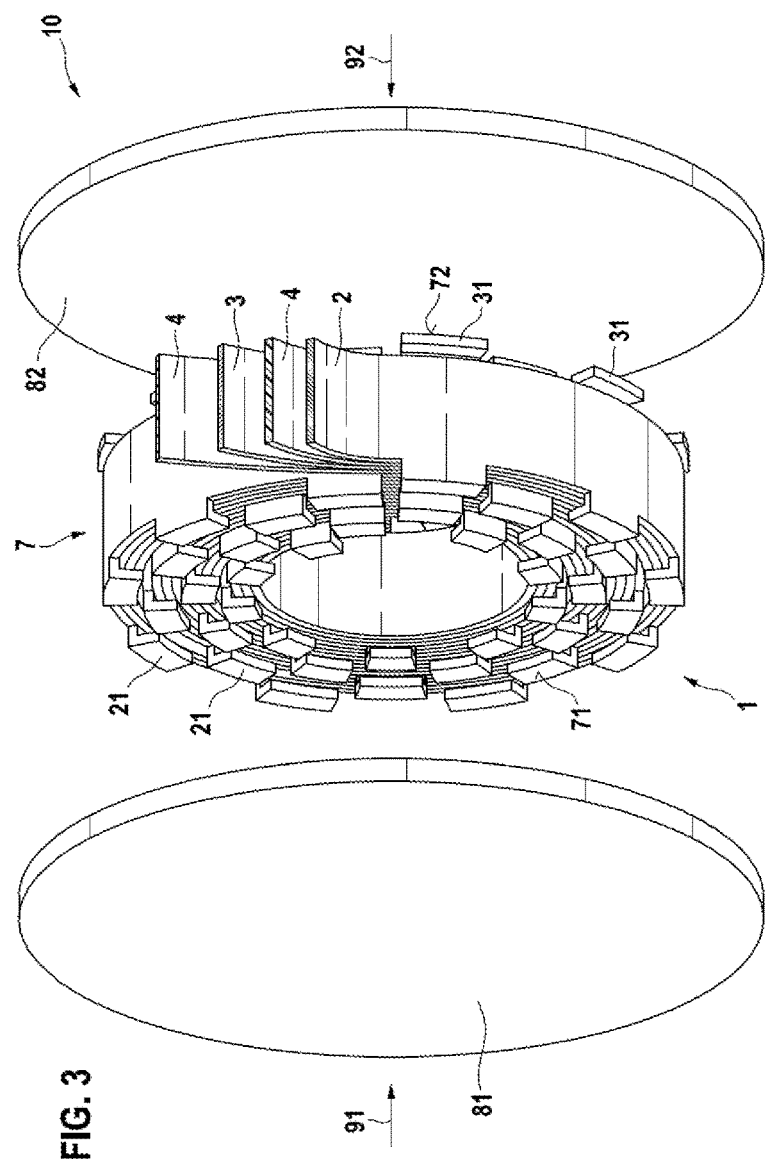
Figure 4:
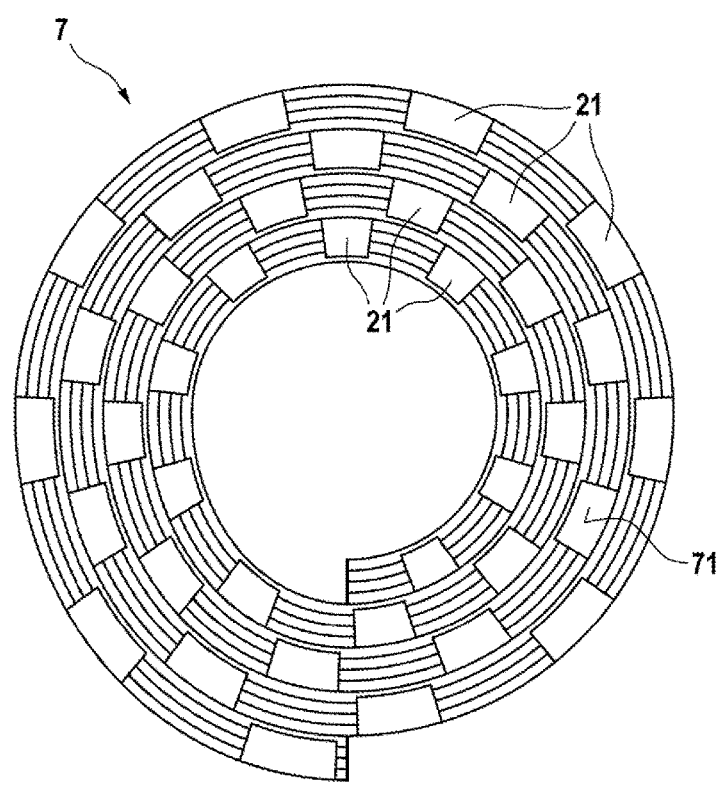

At this juncture it should be noted that the electrode arrangement 1 shown in FIG. 1 and in particular the electrode arrangement 1 shown in FIG. 2 can form the starting point for the wound electrode arrangements 1 shown in FIGS. 3 and 4.

FIG. 3 schematically shows a perspective illustration of an electrode arrangement 1 formed as a cell winding 7. In this case, the positive electrode layer 2 and the negative electrode layer 3 are separated from one another in an electrically insulating manner by separator layers 4.

In this case, the cell winding 7 has a first base surface 71 formed in a substantially planar fashion and a second base surface 72 formed in a substantially planar fashion. As can be discerned from FIG. 3, the first base surface 71 and the second base surface 72 are arranged opposite one another. Furthermore, FIG. 3 shows by way of example one embodiment of a first current conductor 81 and of a second current conductor 82. In this case, the first current conductor 81 is shifted in the direction 91 shown for an electrical contacting of the plurality of first contacting sections 21. Furthermore, in this case, the second current conductor 82 is shifted in the direction 92 shown for an electrical contacting of the plurality of second contacting sections 31.

It should be noted at this juncture that the arrangement shown in FIG. 3 is also designated as battery cell 10. In this case, the first current conductor 81 and the second current conductor 82 form housing walls of the housing of the battery cell 10.

FIG. 4 schematically shows an electrode arrangement 1 formed as a cell winding 7 in a side view, wherein a first base surface 71 shown in FIG. 3 is discernible. In this case, a plurality of first contacting sections 21 of the positive electrode layer 2 can be discerned, which cover the first base surface 71 uniformly. Furthermore, non-covered locations of the separator layer 4 can also be discerned.

What is claimed is:

1. An electrode arrangement of a battery cell (10) comprising
a positive electrode layer (2) and a negative electrode layer (3), which are separated from one another in an electrically insulating manner by a separator layer (4), wherein the positive electrode layer (2) and the negative electrode layer (3) each have a first edge corresponding to a first edge of the electrode arrangement and an opposite second edge corresponding to an opposite second edge of the electrode arrangement;
a plurality of first contacting sections (21) extending from the first edge of the positive electrode layer (2) for an electrical contacting of the positive electrode layer (2) by a first current conductor (81), wherein no contacting sections extend from the second edge of the positive electrode layer (2); and
a plurality of second contacting sections (31) extending from the second edge of the negative electrode layer (3) for an electrical contacting of the negative electrode layer (3) by a second current conductor (82), wherein no contacting sections extend from the first edge of the negative electrode layer (3).

2. The electrode arrangement according to the preceding claim 1, characterized in that at least one first contacting section (21) and/or at least one second contacting section (31) are formed in such a way that the at least one first contacting section (21) and/or the at least one second contacting section (31), for an electrical contacting by the first current conductor (81) and/or the second current conductor (82), respectively, are arranged in an angled manner with respect to a plane formed by the electrode arrangement (1).

3. The electrode arrangement according to claim 1, characterized in that at least one first contacting section (21) and at least one second contacting section (31) are formed in such a way that the at least one first contacting section (21) and the at least one second contacting section (31), for an electrical contacting by the first current conductor (81) and the second current conductor (82) respectively, are arranged substantially parallel to one another.

4. The electrode arrangement according to claim 1, characterized in that at least one first contacting section (21) and at least one second contacting section (31) are formed in such a way that the at least one first contacting section (21) and the at least one second contacting section (31), for an electrical contacting by the first current conductor (81) and the second current conductor (82) respectively, are arranged in directions facing away from one another.

5. The electrode arrangement according to claim 1,
wherein the electrode arrangement (1) has a longitudinal direction (5), and
the plurality of first contacting sections (21) are arranged on a first outer side (22) of the positive electrode layer (2) and/or
the plurality of second contacting sections (31) are arranged on a second outer side (32) of the negative electrode layer (3),
characterized in that
the first outer side (22) of the positive electrode layer (2) and the second outer side (32) of the negative electrode layer (3), in the longitudinal direction (5) of the electrode arrangement (1), are arranged on mutually opposite outer sides (22, 32) of the electrode arrangement (1).

6. The electrode arrangement according to claim 1,
wherein the electrode arrangement (1) has a longitudinal direction (5), and
wherein a first contacting section (21) of the plurality of first contacting sections (21) has in each case a first surface (23), and
wherein a second contacting section (31) of the plurality of second contacting sections (31) has in each case a second surface (33),
characterized in that
the electrode arrangement (1) has at least one region in which, in the longitudinal direction (5) of the electrode arrangement (1), the widths of the first contacting sections (21) and/or the widths of the second contacting sections (31) increase.

7. The electrode arrangement according to claim 1,
wherein the electrode arrangement (1) has a longitudinal direction (5), and
wherein two adjacent first contacting sections (21) of the plurality of first contacting sections (21) are spaced apart from one another in each case by a first spacing (24), and
wherein two adjacent second contacting sections (31) of the plurality of second contacting sections (31) are spaced apart from one another in each case by a second spacing (34),
characterized in that
the electrode arrangement (1) has at least one region in which, in the longitudinal direction (5) of the electrode arrangement (1), the first spacings (24) of two first contacting sections (21) and/or the second spacings (34) of two second contacting sections (31) increase.

8. The electrode arrangement according to claim 1,
wherein the positive electrode layer (2) is arranged in a manner spaced apart from the plurality of second contacting sections (31) or is separated therefrom in an electrically insulating manner by the separator layer (4), and/or
wherein the negative electrode layer (3) is arranged in a manner spaced apart from the plurality of first contacting section (21) or separated therefrom in an electrically insulating manner by the separator layer (4).

9. The electrode arrangement according to claim 1,
characterized in that
at least one first contacting section (21) and/or at least one second contacting section (31) partly have/has an electrically insulating coating (26, 36).

10. The electrode arrangement according to claim 1,
characterized in that
at least one first contacting section (21) and/or at least one second contacting section (31) comprises an elastic portion are formed at least partially in an elastic fashion.

11. The electrode arrangement according to claim 1,
characterized in that
the electrode arrangement (1) is formed in a wound fashion, wherein
the positive electrode layer (2) and the negative electrode layer (3) are separated from one another in an electrically insulating manner by a separator layer (4).

12. The electrode arrangement according to claim 11,
wherein the electrode arrangement (1, 7) formed in a wound fashion has a substantially planar first base surface (71) formed by the plurality of first contacting sections (21) extending generally perpendicular to the positive electrode layer (2) and a substantially planar second base surface (72) formed by the plurality of second contacting sections (31) extending generally perpendicular to the negative electrode layer (3), wherein the first base surface and the second base surface are arranged opposite one another,
characterized in that
the first current conductor (81) is arranged on the first base surface (71) and/or the second current conductor (82) is arranged on the second base surface (72).

13. A battery cell comprising an electrode arrangement (1) according to claim 1, characterized in that
the electrode arrangement (1) is wound in a circular shape, wherein the first contacting sections (21) are generally perpendicular to the positive electrode layer (2) and the second contacting sections (31) are generally perpendicular to the negative electrode layer (3),
the plurality of first contacting sections (21) are electrically contacted by a first current conductor (81), wherein the first current conductor (81) is a plate, and
the plurality of second contacting sections (31) are electrically contacted by a second current conductor (82), wherein the second current conductor (82) is a plate.

14. The battery cell according to claim 13,
wherein the battery cell (10) comprises a housing having at least one housing wall,
characterized in that
the at least one housing wall is formed as first current conductor (81) or as second current conductor (82).

15. The battery cell according to claim 13,
wherein the first current conductor (81) and/or the second current conductor (82) have/has an electrically conductive coating.

16. A method for producing a battery cell, the method comprising
  providing in a first step an electrode arrangement (1) according to claim 1, wherein the first and second contacting sections are generally perpendicular to the positive and negative electrode layers, and
  providing in a second step the first current conductor (81) and the second current conductor (82),
  wherein in a third step the plurality of first contacting sections (21) are electrically contacted by the first current conductor (81) and the plurality of second contacting sections (31) are electrically contacted by the second current conductor (82).

17. The battery cell according to claim 13,
  wherein the battery cell (10) comprises a housing having a first housing wall and a second housing wall,
  characterized in that
  the first housing wall is formed as first current conductor (81) and the second housing wall is formed as second current conductor (82).

18. The battery cell according to claim 13,
  wherein the first current conductor (81) and/or the second current conductor (82) have/has an electrically conductive coating composed of gold, nickel or carbon.

19. A battery cell comprising the electrode arrangement of claim 1, wherein
  the electrode arrangement is wound into a generally cylindrical structure having a central axis, a first end (71) and a second end (72), the first and second ends being generally perpendicular to the central axis, wherein the first edge of the positive electrode layer (2) corresponds to the first end (71) and an opposite second edge of the positive electrode layer (2) corresponds to the second end (72), the plurality of first contacting sections (21) extending from the first edge of the positive electrode layer (2) and defining the first end, wherein widths of the first contacting sections and spacings between adjacent first contacting sections increase along a length of the positive electrode layer in a direction away from the central axis, wherein
  the first edge of the negative electrode layer (3) corresponds to the first end (71) and an opposite second edge of the negative electrode layer (3) corresponds to the second end (72), the plurality of second contacting sections (31) extending from the second edge of the negative electrode layer and defining the second end, wherein widths of the second contacting sections and spacings between adjacent second contacting sections increase along a length of the negative electrode layer in the direction away from the central axis; and
  wherein one of the first contacting sections and the second contacting sections extend radially inward and the other of the first contacting sections and the second contacting sections extend radially outward;
  wherein the first current conductor plate (81) is positioned on the first end of the electrode arrangement and contacts the first contacting sections;
  wherein the second current conductor plate (82) is positioned on the second end of the electrode arrangement and contacts the second contacting sections; and
  wherein the first and second current conductor plates partially form a housing of the battery cell.

20. The electrode arrangement according to claim 1,
  wherein the electrode arrangement defines a plane, and wherein the first contacting sections and the second contacting sections extend in opposite directions and generally perpendicular to the plane.

21. The battery cell according to claim 13,
  wherein one of the first contacting sections and the second contacting sections extend radially inward and the other of the first contacting sections and the second contacting sections extend radially outward.

* * * * *